Figure 1:
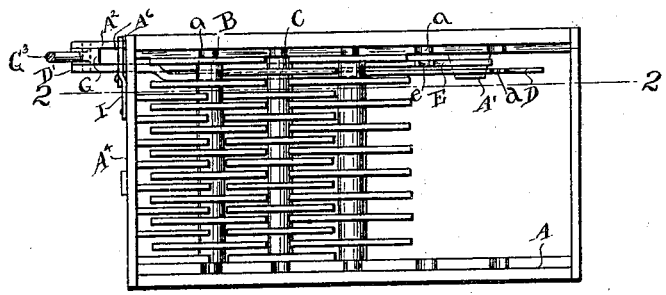

No. 725,738. PATENTED APR. 21, 1903.
A. B. MARSHALL, R. ROUSE, Jr. & G. G. KNIFFIN.
SHAKING GRATE.
APPLICATION FILED APR. 22, 1902.
NO MODEL.

WITNESSES:
Marc A. Guigou.
M. F. Boyle.

INVENTORS
Aquila B. Marshall
Richard Rouse, Jr.
and G. G. Kniffin
By Thomas Drew Stetson
ATTORNEY

THE NORRIS PETERS CO., PHOTO-LITHO., WASHINGTON, D. C.

UNITED STATES PATENT OFFICE.

AQUILA B. MARSHALL, OF NEW YORK, N. Y., AND RICHARD ROUSE, JR., OF ELIZABETH, AND GEORGE G. KNIFFIN, OF BAYONNE, NEW JERSEY, ASSIGNORS TO THE BOYNTON FURNACE COMPANY, OF NEW YORK, N. Y., A CORPORATION OF NEW JERSEY.

SHAKING-GRATE.

SPECIFICATION forming part of Letters Patent No. 725,738, dated April 21, 1903.

Application filed April 22, 1902. Serial No. 104,157. (No model.)

*To all whom it may concern:*

Be it known that we, AQUILA B. MARSHALL, residing in the borough of Manhattan, in the city and State of New York, and RICHARD ROUSE, Jr., residing at Elizabeth, in the county of Union, and GEORGE G. KNIFFIN, residing at Bayonne, in the county of Hudson, State of New Jersey, citizens of the United States, have invented a certain new and useful Improvement in Shaking-Grates, of which the following is a specification.

It has long been common to form grates in sections, each section capable of rocking on trunnions, and to provide means for shaking two or more sections simultaneously by the application of force through a suitable lever. A good style of such grate is that set forth in the United States patent to Charles Yingling, dated April 9, 1901, No. 671,905. The present invention is an improvement thereon, and reference may be made to such patent for any details which are not fully set forth herein.

Our improvement leaves the space below the grate, usually termed the "ash-pit," clear, the operating-arms, which extend down from each section, being close to the end of each. It is more particularly intended for small furnaces, such as the Boynton furnace, for heating buildings, and we will describe it as thus applied. Instead of connecting the arms which extend down from the ends of the several sections by links pivoted thereto and partaking of the rising and sinking motions due to the curved paths described by the several pivots we receive the pivots of the arms in corresponding open-topped slots formed in slides which are reciprocated directly forward and backward side by side at a uniform level, the slides being each connected directly to the same operating-lever one above and the other below the center of motion.

Our invention induces the desired shaking action, with the advantage that all the sections of the grate may be lifted out and repaired or exchanged at any time without the labor of disconnecting any pivot. The front end of each slide is formed with a bend, one downward and the other upward, so that the connections to the operating-lever are the proper distance from the center, and the lever need be rocked only through a small portion of the circle. We have discovered that it is practicable to reciprocate such slides to the moderate extent required without any links for connection. A little looseness in the joints is all that is necessary to allow freedom of motion. We provide specially convenient and efficient means for holding the sections firmly in the position for use.

The following is a description of what we consider the best means of carrying out the invention.

The accompanying drawings form a part of this specification.

Figure 2:
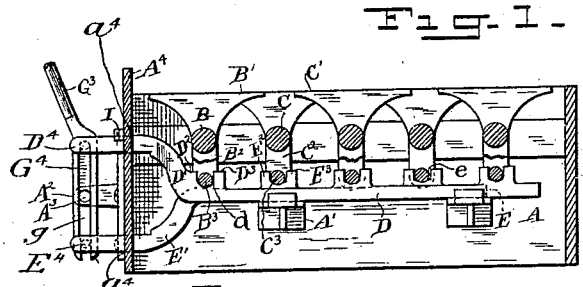
Figure 4:
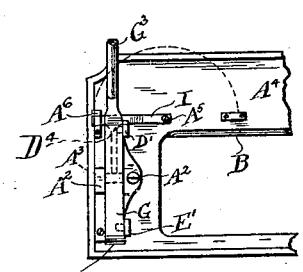
Figure 3:
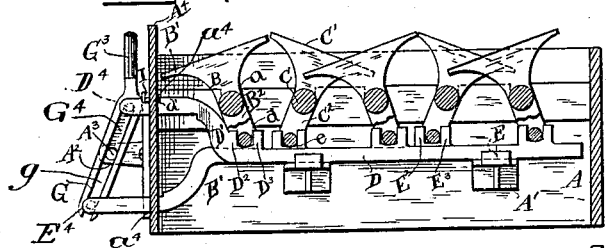
Figure 5:
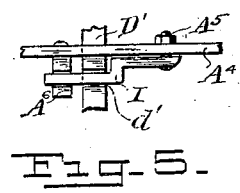
Figure 6:
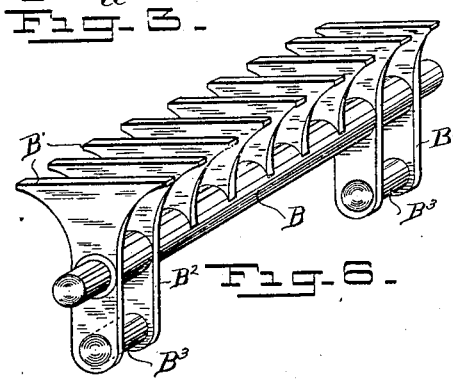
Figure 7:
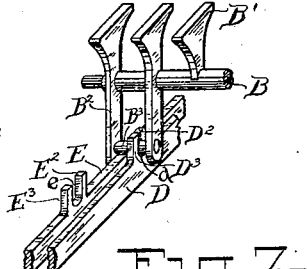
Figure 8:
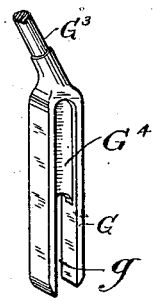

Figure 1 is a plan view giving an outline of the furnace with some of the grate-sections in place. Fig. 2 is a longitudinal vertical section on the line 2 2 in Fig. 1. This shows the parts at rest, as with the fire burning—the position for use. Fig. 3 corresponds to Fig. 2 except that the mechanism is being operated to shake the grate. Fig. 4 is a front view of a portion. Fig. 5 is a plan view of a portion on a larger scale. The remaining figures are perspective views showing portions detached. Fig. 6 shows one of the sections of the grate in perspective. Fig. 7 shows a portion of a section and also a portion of the slides properly connected. Fig. 8 shows a portion of the operating-lever.

Similar letters of reference indicate corresponding parts in all the figures where they appear.

A A, &c., are portions of the supporting-frame, and $a$ represents deep notches formed therein for the reception of the trunnions of the sections.

B and C are the sections, respectively, of the grate arranged to rock freely. The several sections B, having the grate-fingers B', are each provided with a pair of arms $B^2$, extending downward close to one end and carrying a short horizontal pin $B^3$. The sections C are provided with corresponding fingers C' and have similar arms C² and a similar pin C³.

A' represents fixed supports formed in the adjacent side of the ash-pit, and D and E are slides supported and guided thereon free to move forward and backward. In the upper side of the slide D are deep open slots $d$, each of which receives one of the pins B³. In the upper side of the slide E are corresponding open slots $e$, each of which receives a pin C³. The open slots $d$ and $e$ are formed by extending the metal of each slide upward, as shown by D² D³ on the slide D and E² E³ on the slide E. These upward extensions are on each side of each pin, respectively, which they are to actuate, but leave the space between, which we term an "open slot." They also leave the main body of the slide of so little height that it does not touch the corresponding pins for the other set of sections. Thus the pin B³ in each pair of downwardly-extending arms B² extends across both slides D and E, but crosses the slide E at a point where it is unaffected thereby. It is affected only by the slide D, which receives it in the open slot $d$ between the upward extensions D² D³. So, also, the pin C³ always crosses the slide D at some point where it is unaffected thereby, but is engaged in the slot $e$ between the extensions E² and E³ on the slide E.

A² is a fixed bracket extending forward from the front of the furnace and carrying a pivot A³, on which rocks an upright lever G, having a handle G³, conveniently shaped to be operated by the hand of the attendant.

The slide D is formed upward at and near the front end, as indicated by D', and carries a transverse pin D⁴. The slide E is correspondingly formed downward at and near its front end E' and similarly carries a transverse pin E⁴. To operate these slides D and E, and consequently to rock the grate-sections B and C, we employ the lever G, having a long open slot $g$ at its lower end, which is easily applied and removed by simply lifting and lowering it. Fig. 8 shows it in perspective, half the length of the slot $g$ being braced by a web G⁴. Figs. 1, 2, and 3 show it in place for work. The slot engages a pivot A³, carried on a fixed bracket A² and turning thereon as a fulcrum, and also engages the pins D⁴ and E⁴, fixed on the slides D and E, respectively, the slot allowing for the difference in the motions.

The raised portion B' at the front end of the slide D and the depressed portion E' at the front end of the slide E extend out through corresponding closed slots or holes $a^4$ in the front plate A⁴ of the ash-pit and are extended parallel to each other and to the motion of the slides. It is important to be able to hold the two slides, and consequently both sets of grate-sections B and C, stationary, with their top surfaces level. This is the position in which the parts will ordinarily be required to serve, except during the brief periods of shaking. We provide a notch $d'$ in the upper edge of the part D' and connect a latch I by a loose rivet A⁵, set in the front of the plate A⁴, so arranged that when it is thrown over to the right, as shown in dotted lines in Fig. 4, it will be of no effect and will allow the sections to be rocked freely; but when this is completed and the fingers B' and C' are brought to the level position the latch I may be thrown to the left, describing half of a circle, and may engage in the notch $d'$ and hold the whole firmly. This latch is offset, as shown in Fig. 5, so that it presents a wide surface to receive a lifting blow to release it and a depressing blow to engage it. A keeper A⁶ in the form of a slight hook is set in the front of the plate A⁴, adapted to receive and support the free end of this latch stiffly when in the locked position. The notched slide D D' being integral and the connection with the pins B³ C³ having little or no lost motion, the grate-sections are held with firmness when locked. The latch is lifted and thrown over when the grate-sections are to be shaken.

Our grate serves relatively to the fuel similarly to that described in the Yingling patent aforesaid. It also serves in the same manner as the Yingling device with ashes and fine clinkers which descend through the grate at the several rockings, either when the sections are at rest or when they are rocked, except that the operating means being close to one side of the ash-pit the main space in the ash-pit is clear for operating by any ordinary implement to remove the ashes. A still more important difference is found when it shall be required for any reason to lift out one or more of the sections of the grate. Nothing is necessary with our invention but to lift each out of its place. In replacing the sections it is only necessary to have the deep notches $a$ clear of ashes to receive the trunnions of the sections and the open slots $d$ and $e$ also clear to receive the pins B³ and C³ and to be careful in introducing the grate-sections into place to have the parts received in the proper recesses. Our latch I, holding the rocking sections against motion in either direction, supports the sections efficiently for use, with their upper surfaces level, and when the latch is thrown over allows them to be freely rocked in both directions from such level position.

One advantage of our construction is that a better support for the bars D and E near the front ends is provided by the rigid extension of each through the front plate A⁴. The depressed front end E', forged or cast integral with the remainder of the bar E, extends out through the proper low slot $a^4$, and the elevated front end D', similarly rigid with the bar D, extends out through its proper high slot, (similarly marked $a^4$,) and the portions both of D' and E' which move through the plate being parallel to the main portions D and E bear on the bottom of the slots $a^4$, and thus give a front bearing additional to the bearings A'.

Modifications may be made without departing from the principle or sacrificing the advantages of the invention.

We have shown five sections of the grate—three sections B and two sections C; but these numbers may be varied, taking care to have them match properly to each other and to the other parts. Instead of engaging the latch I with the slide D it may be engaged with the slide E, or there may be two latches, either connected or working independently, engaging one with each. The keeper $A^6$ may be omitted. We have shown each section as made with the arms in duplicate, one at each end. This is of advantage by allowing the section to be reversed if one of the arms is broken or in any wise defective; but these arms may be omitted at one end.

We claim as our invention—

1. A shaking-grate mechanism comprising oppositely-rocking sections B and C having arms $B^2 C^2$ extending downward and carrying transverse pins $B^3 C^3$, in combination with slides D and E resting on supports A' and also extending through the front plate at $A^4$ so as to be guided in right lines, having open slots $d\ e$ in the upper side of such slides each receiving a pin of one section and having portions between these open slots so low as to avoid contact with the corresponding pin of the opposite section, and an operating-lever G directly connected by a slot and pin to the elevated arm D' of one slide and similarly connected to the depressed arm E' of the other slide, all arranged for joint operation substantially as herein specified.

2. A shaking-grate mechanism comprising oppositely-rocking sections B and C having arms $B^2 C^2$ extending downward and carrying transverse pins $B^3 C^3$, in combination with slides D and E resting on supports A' and also extending through the front plate at $A^4$ so as to be guided in right lines, having open slots $d\ e$ in the upper sides each receiving a pin of one section and having portions between these slots so low as to avoid contact with the corresponding pin of the opposite section, and an operating-lever G directly connected by a slot and pin to the elevated arm D' of one slide, and similarly connected to the depressed arm E' of the other slide, these operating means being arranged close to one side of the ash-pit, so as to leave the middle portion of the ash-pit clear of obstruction, all substantially as herein specified.

3. A shaking-grate mechanism comprising oppositely-rocking sections B and C, each section having two sets of arms extending downward, one set near each end, each set carrying transverse pins $B^3 C^3$ respectively but allowing the sections to be reversed in position, in combination with slides D and E resting on supports A' and also extending through the front plate at $a^4$ so as to be guided in right lines, having open slots $d$ and $e$ in the upper sides respectively, each receiving a pin of one section and having portions between these open slots so low as to avoid contact with the corresponding pin of the opposite section, and an operating-lever G directly connected by a slot and pin to the elevated arm D' of one slide and similarly connected to the depressed arm E' of the other slide, said slides being arranged close to one side of the ash-pit and adapted to engage and give motion to the several sections of the grate however either one or more of the sections may be reversed in position and to leave the middle portion of the ash-pit clear of obstruction, all substantially as herein specified.

4. In shaking-grate mechanism having rocking sections B and C, and slides D and E connected thereto by means of open slots as shown, an operating-lever G directly connected to the elevated front arm D' of the slide D by the slot $g$ and pin $D^4$, and similarly connected by a corresponding pin to the depressed front arm E' of the other slide with corresponding provisions for allowing for the circular motion of the lever, a notch $d'$ in the upper side of the projecting part of one of the slides arranged to stand out from the front of the furnace when the grate-sections are to be held at rest in the position for use and a swinging latch I turning on a fixed pivot $A^5$ in the furnace-front, engaging in said notch, and horizontally offset so as to bring it sufficiently out from the front of the furnace to allow it to be easily acted on in raising and depressing it, and the keeper $A^6$, all combined and arranged to serve substantially as herein specified.

AQUILA B. MARSHALL.
    RICHARD ROUSE, JR.
    GEO. G. KNIFFIN.

Witnesses:
 C. M. BENEDICT,
 GEORGE V. GREEY.